UNITED STATES PATENT OFFICE.

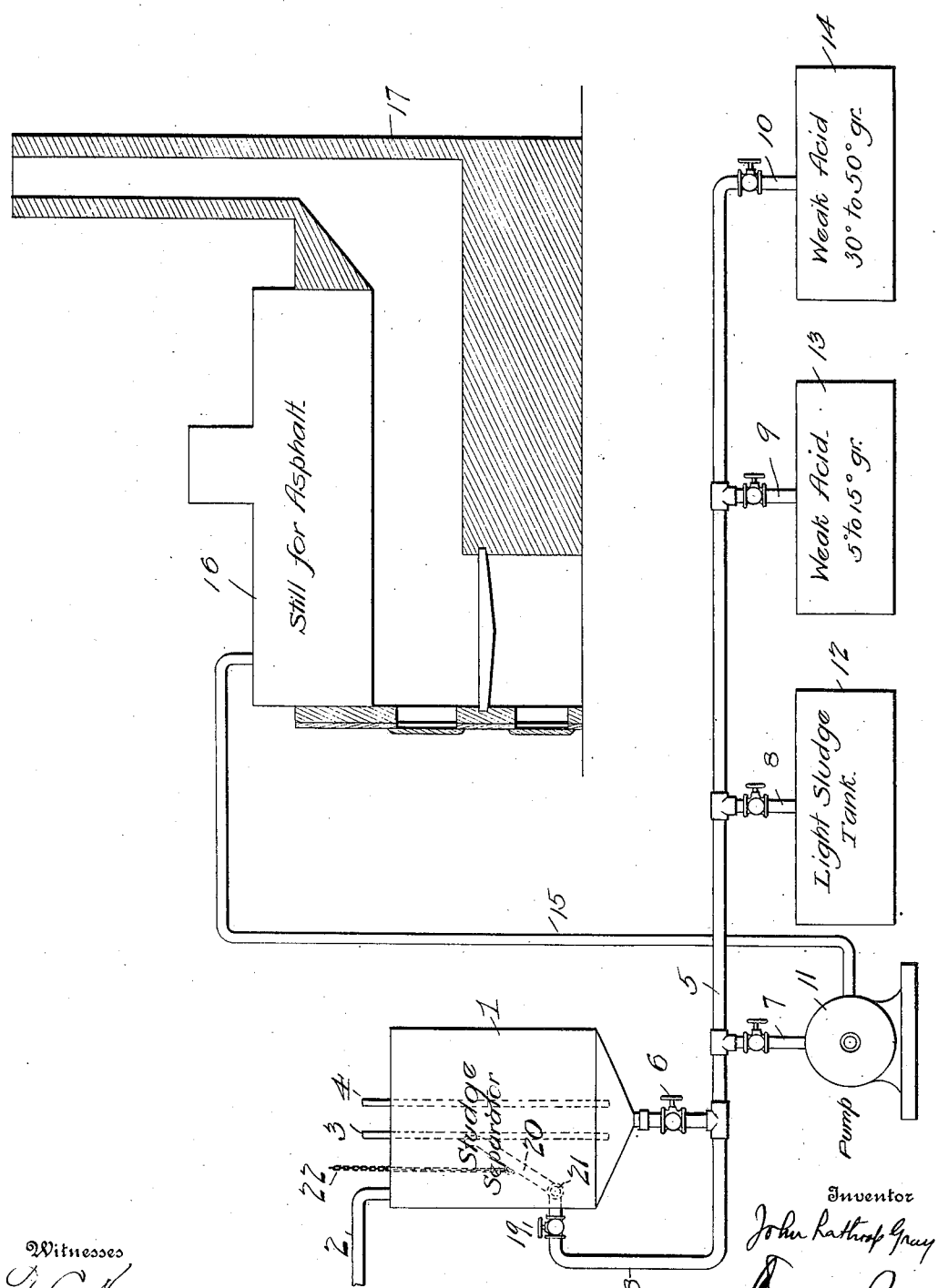

JOHN LATHROP GRAY, OF ELIZABETH, NEW JERSEY.

PROCESS OF TREATING PETROLEUM SLUDGE.

No. 923,428.   Specification of Letters Patent.   Patented June 1, 1909.

Application filed June 24, 1905. Serial No. 266,764.

*To all whom it may concern:*

Be it known that I, JOHN LATHROP GRAY, a citizen of the United States, residing at Elizabeth, in the county of Union and State of New Jersey, have invented certain new and useful Improvements in Processes of Treating Petroleum Sludge; and I do hereby declare the following to be a full, clear, and exact description of the invention, such as will enable others skilled in the art to which it appertains to make and use the same.

My invention relates to processes of treating petroleum acid sludge for the purpose of separating the hydrocarbon constituents of the sludge into grades of various gravities. I have discovered that the constituents of this petroleum acid sludge may be separated into relatively light and heavy grades, much as are the grades of oil, and my invention is based upon a discovery of the real constitution of these sludges.

Sludge acid is a waste product created by the treatment of oil distillates and derivatives from distillates with acid. This sludge is a chemical combination of the impurities of sludge, or unsaturated hydro-carbons, which the oil contains, united with the acid used for their removal. These unsaturated hydro-carbons exist in the oil in various grades, from that of a fluid oil, (an oil, however, of much heavier gravity than the oil from which the fluid hydro-carbons are derived) through successively heavier and more viscous grades until a hard pitch remains as the heaviest of the several grades. The various grades have varying affinity for the acid used in the treatment. The heaviest grade has the greatest affinity and the lightest the least affinity for the acid.

My process of separating the constituents of the acid sludge into various grades consists essentially in digesting the sludge a number of times, according to the number of grades of constituents to be obtained, with steam, air and water, and in the intervals removing the successive grades of various gravities.

In the treatment of the oil in the process of refining as now commonly practiced the acid is usually used in two applications. The first application is preliminary and amounts to about ten per cent. of the total acid used in the several applications, its function being to remove the entrained water, which would tend to weaken and offset the action of the acid. This first acid, after being drawn off, is followed by additional acid, which does the major part of the actual separation of the unsaturated hydro-carbons.

The product resulting from the combination of these unsaturated hydro-carbons with the acid is known as sludge acid and is insoluble in the oil and heavier than the oil. It therefore settles to the bottom and may be drawn off. It is this product, sludge acid, which is treated by my process to separate the mineral acid from the unsaturated hydro-carbons. This is done by an application of water agitated in the usual manner by air or steam or both. The unsaturated hydro-carbons may be separated into any number of grades of varying gravity by applying the water successively or in a series of applications. A separated, unsaturated hydro-carbon will result from each application of water and each of the succeeding separated unsaturated hydro-carbons of the successive applications will be denser and more viscous in the relative order as already indicated. This is so because the unsaturated hydro-carbons having the least affinity for the acid are the first to separate, and those having the greatest are the last to separate. It is not necessary to add an exact amount of water, as the amount is governed by the nature of the oil from which the acid sludge has been obtained, as a rule the sludge from the heavier oils requiring more water than that from the lighter oils. The gravity at which it is desired to obtain the separated acid and the grade of the unsaturated hydro-carbons are also factors to be considered, and cannot be specified by an exact amount. The amount is governed in practice entirely by the judgment of the operator, and averages generally from thirty to fifty per cent. of the total of the weight of the material being treated, although this is exceeded at times.

In carrying out my process after pumping off the mechanically entrained oil, the acid sludge is digested until the separated unsaturated hydro-carbons rise to the top. This by-product and the acid are then withdrawn and the remaining material is again digested until the next lighter grade of separated unsaturated hydro-carbon rises, when that grade and the acid are withdrawn so continuing until there remains a solid residuum. In carrying out this process there will be slight variations depending upon the relative gravity of the various grades of sludge and the various grades of sludge and the weak acid.

In the first digesting the light separated unsaturated hydro-carbon will rise to the top and the weak acid runs to the bottom leaving the remainder of the original sludge between the two. This separated unsaturated hydrocarbon product may then be withdrawn from the top and the weak acid from the bottom. Ordinarily in the second treatment the second separated unsaturated hydro-carbon will rise to the top, a heavy residuum will go to the bottom with weak acid intervening between the second light separated unsaturated hydro-carbon and the heavy residuum.

In the succeeding description of operation it will be seen that the actual relation of these layers to each other depends upon their specific gravity.

In the accompanying drawing I have diagrammatically illustrated a form of apparatus which may be used in carrying out this process. In that apparatus 1 indicates a sludge separator tank which is supplied with a digesting medium such as water or weak acid by the pipe 2 and into which leads a steam line 3 and an air line 4, which may be or may not be used in carrying out the process, though I find them frequently useful, and in fact preferable. An outlet pipe 5 valved at 6 leads by valve branches 7, 8, 9 and 10 respectively to a pump 11, a "light sludge" or separated unsaturated hydro-carbon tank 12, a weak acid tank 13, and another weak acid tank 14, the tank 14 being intended to receive the weak acid of the higher gravity. A pipe 15 leads from the pump 11 to an asphalt still 16 beneath which is formally represented a furnace 17. I have also provided for virtually skimming off the light separated unsaturated hydro-carbons by means of an adjunctive pipe device. 18 represents a branch pipe leading into the main pipe. The pipe 18 is valved at 19 and passes through, in the form illustrated, the side of the separator tank 1. Communicating with the pipe 18 is a swing section 20 having a joint at 21 and adapted to be operated either by hand or power through the medium of a chain 22. This swing section 20 may be lifted up and down according to the height of the light grade in the tank so that the light grade may be drawn off through this separator connection.

The sludge to be treated is placed in the separator tank 1. It is there treated by water or weak acid supplied by a pipe 2 at the same time that steam is admitted by pipe 3 or air by pipe 4, or both steam and air through these pipes. When the first digesting is completed the products will lie in three layers, the weak acid at the bottom, the remaining unseparated sludge next and the light separated unsaturated hydro-carbon on the top. As previously indicated the light grade may be drawn off through the pipe connections 18—20. When the cock 6 is opened the weak acid is permitted to escape, provided it is at the bottom of the tank, as it will be when it is above 12° Baumé gravity. The weak acid in this case runs to the end tank 14. The process is then repeated, additional water or weak acid being supplied by the pipe 2 and additional steam or additional air, or both being supplied as indicated. At the end of this washing or digesting the material in the separator again lies in three layers, the light separated unsaturated hydro-carbon being on top. The weak acid, if it at this time should be of lower gravity than 12° Baumé will be next with the heavy separated hydro-carbon at the bottom. In this case the heavy residuum, the cock in the pipe 7 being opened, runs into the pump and is thence forced to the asphalt still. Then the cock in the pipe 7 being closed the weak acid in this case by the connections indicated, will be permitted to pass to the middle tank 13. If the light grade has not previously been drawn off through its pipe connections 18—20 it may be now drawn directly through the outlet at the bottom of the separator.

I have not illustrated in this application the means for pumping off the mechanically entrained oil because that feature is so thoroughly understood and subject to so many modifications that it does not require specific illustration.

I have also invented a process of treating various grades of petroleum sludge to separate the acid therefrom, and a process for forming pitch or asphaltum from sludge, which are set forth and claimed in companion applications Nos. 266,765 and 266,763, respectively. By the process of application No. 266,765 I separate weak acid from the acid sludge in, for example, two digestings, using the accumulated weak acid in digesting a succeeding body of acid sludge. By the process of application No. 266,763 I digest the acid sludge until the major part of the acid has been removed, then heat the mass beyond the condensing point of steam, and, finally digest the mass by a steam spray until it is converted into pitch.

Previous to carrying out the process of this application No. 266,764, I may separate the acid by the process of application No. 266,765.

In carrying out the process of the present application No. 266,764, I secure a residuum which may be treated by the process of my application No. 266,763. These several processes together constitute practically a new industry, so that each separate process is enhanced in value by the fact that the other processes are supplementary in securing the several commercial results. As a preliminary to the process of this application and with a view to the succeeding processes of my companion applications I pump off any mechanically entrained oil which may rise to the top, when the sludge settles either with or without being heated. This step is advantageously performed in carrying out this process because if it is not performed before the process of sludge separation is started, the entrained oil will mix with the first light grade and pass off with it. While this separation of the entrained oil may be deferred until I proceed to form pitch or asphaltum either from the original body of the sludge or from some or all of the grades into which it may be separated, I regard it as advisable to make it a preliminary step of the process herein described.

Having thus fully described my invention, what I claim is:—

1. The process of separating the constituents of petroleum sludge into various grades which consists in digesting the sludge until a light grade of unsaturated hydrocarbons rises to the top, withdrawing such light grade and the acid, then digesting again until the next lighter grade rises, removing that grade and acid, and so continuing until there remains a solid residuum.

2. The process of separating the constituents of petroleum sludge into various grades which consists in pumping off any mechanically entrained oil which may rise to the top, digesting the sludge until the light constituents including the unsaturated hydro-carbons rise to the top, withdrawing this by-product and the acid, then digesting again until the next lighter grade rises, removing that grade and the acid, and so continuing until there remains a solid residuum.

3. The process of separating constituents of petroleum acid sludge into various grades which consists in digesting the sludge until a light grade of unsaturated hydrocarbons rises to the top and the weak acid settles to the bottom, then drawing off the light sludge and the weak acid, digesting the residuum again, then drawing off the second light grade from the top, the heavy residuum from the bottom and finally the weak acid.

4. The process of separating constituents of petroleum acid sludge into various grades, which consists in digesting the acid sludge until the mass separates into divisions of a light grade of unsaturated hydro-carbons, weak acid and heavy residuum, and then separately removing the different grades and the weak acid.

In testimony whereof I affix my signature, in presence of two witnesses.

JOHN LATHROP GRAY.

Witnesses:
FRANK B. MASON,
THOMAS GARVIN GRAY.